Figure 11:
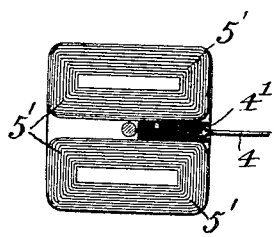

No. 800,873. PATENTED OCT. 3, 1905.
E. F. NORTHRUP.
ELECTRICAL MEASURING INSTRUMENT.
APPLICATION FILED NOV. 19, 1904.
3 SHEETS—SHEET 1.
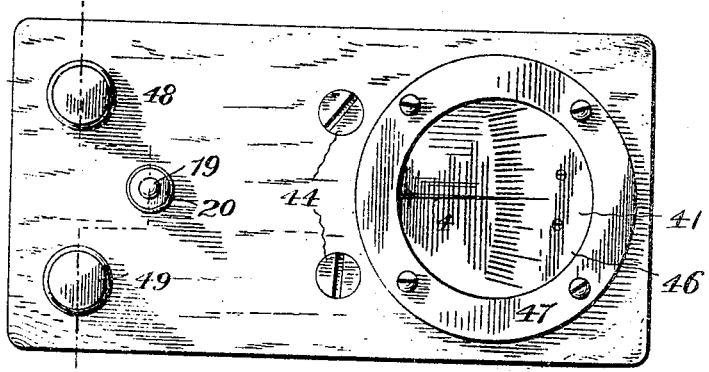
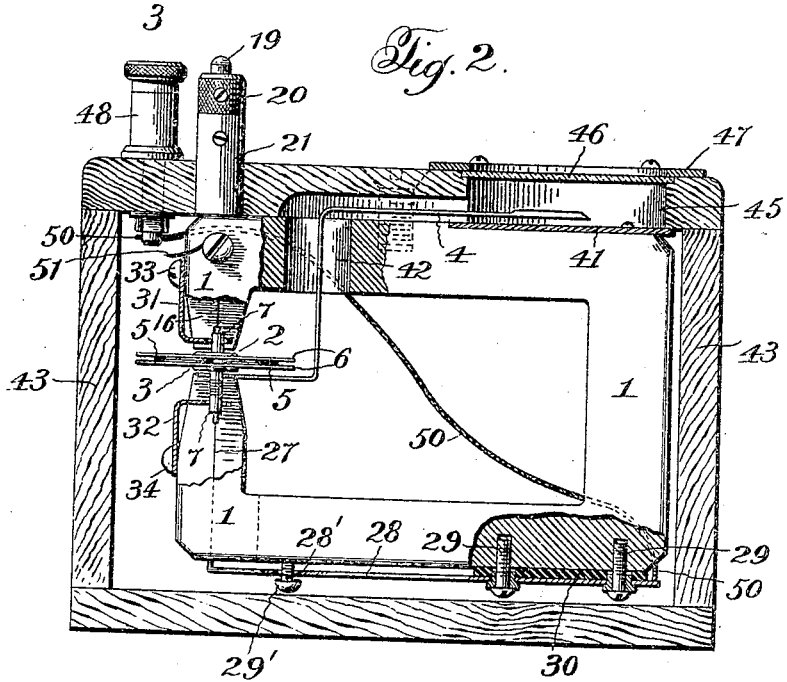
Witnesses:
Jas. E. Hutchinson
W. Schoenborn
Inventor:
E. F. Northrup,
By John H. Hall
his Attorney No. 800,873. PATENTED OCT. 3, 1905.
E. F. NORTHRUP.
ELECTRICAL MEASURING INSTRUMENT.
APPLICATION FILED NOV 19, 1904.
3 SHEETS—SHEET 2.
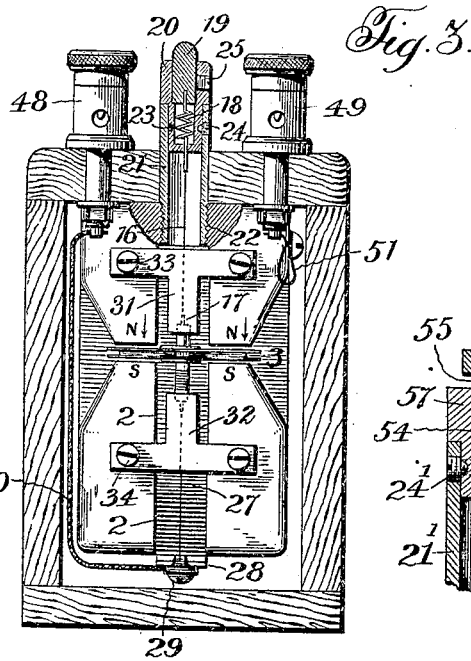
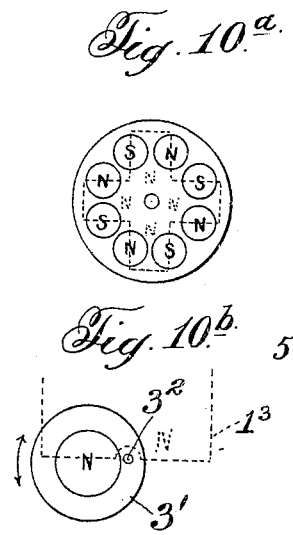
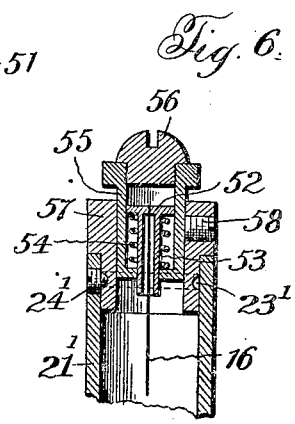
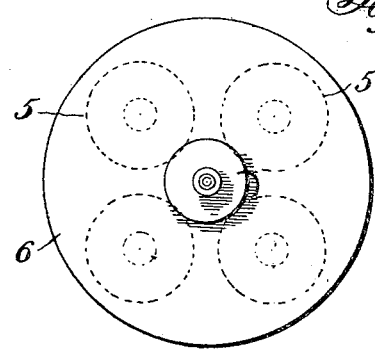
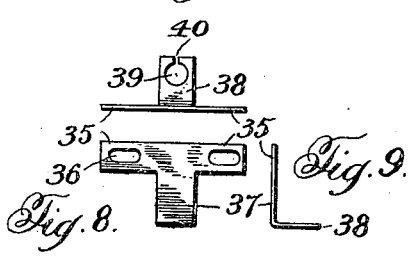
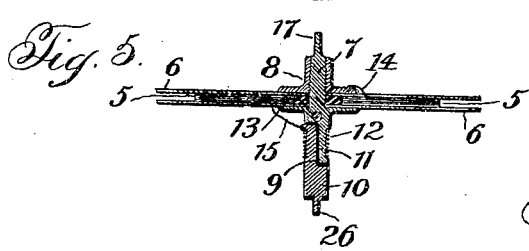
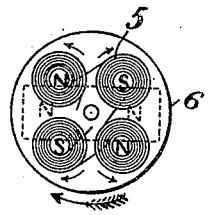
Witnesses:
Jas. Es. Hutchinson
W. Schornborn
Inventor:
E. F. Northrup,
By John H. Holt
his Attorney.

No. 800,873. PATENTED OCT. 3, 1905.
E. F. NORTHRUP.
ELECTRICAL MEASURING INSTRUMENT.
APPLICATION FILED NOV. 19, 1904.

3 SHEETS—SHEET 3.

Witnesses
Jas. E. Hutchinson
W. E. Schoenborn

Inventor
E. F. Northrup,
By John H. Hall
his Attorney

UNITED STATES PATENT OFFICE.

EDWIN F. NORTHRUP, OF PHILADELPHIA, PENNSYLVANIA, ASSIGNOR TO THE LEEDS AND NORTHRUP COMPANY, OF PHILADELPHIA, PENNSYLVANIA, A CORPORATION OF PENNSYLVANIA.

ELECTRICAL MEASURING INSTRUMENT.

No. 800,873. Specification of Letters Patent. Patented Oct. 3, 1905.

Application filed November 19, 1904. Serial No. 233,454.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Electrical Measuring Instruments, of which the following is a specification.

This invention relates to improvements in electrical measuring and indicating instruments—such as galvanometers, ammeters, voltmeters, wattmeters, electrodynamometers, and the like—in which the current is indicated or detected or the measurement made by the movement of a coil system in a magnetic field; and the principal objects of the invention are to so choose the mechanical arrangement of the parts that a suspended system may be used with freedom from danger of breakage, to compress the instrument into the smallest possible space in a vertical direction, and to so choose the shape of what is designed to provide the magnetic field that the simplest form of construction may be employed, so that if this be a magnet a single casting will suffice.

Another object of this invention is to increase the tensile strength of the suspension by the employment of a plurality of filaments placed side by side without increasing the torsion to anything like the same extent that it would be were the same tensile strength gained by the employment of a single filament of increased diameter.

With the above objects in view, and others which will hereinafter appear, my said invention consists in the novel combination and arrangement of parts herein described, and pointed out in the claims, in which latter I employ the expression "electrical measuring instrument" in its broader sense to cover detector-galvanometers and instruments designed to indicate the presence of current, as well as instruments which actually measure the same.

By this invention I am enabled to produce an instrument of extreme simplicity and compactness, while at the same time preserving the sensitiveness and general efficiency of other forms which it has hitherto been considered impracticable to make so simple and compact. In other words, I combine the compactness and simplicity of single-magnet pivoted coil instruments with the sensitiveness and delicacy of those which employ a suspended system.

Figure 12:
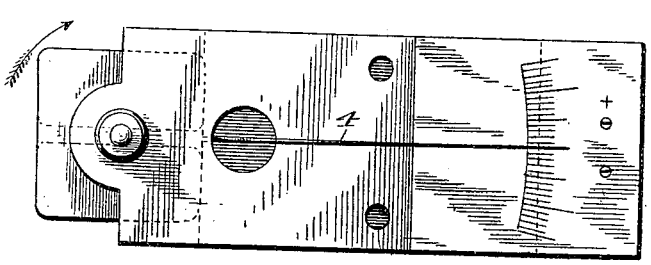
Figure 13:
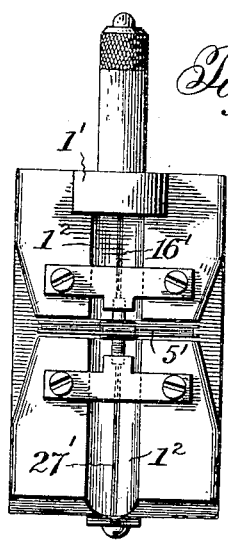
Figure 14:
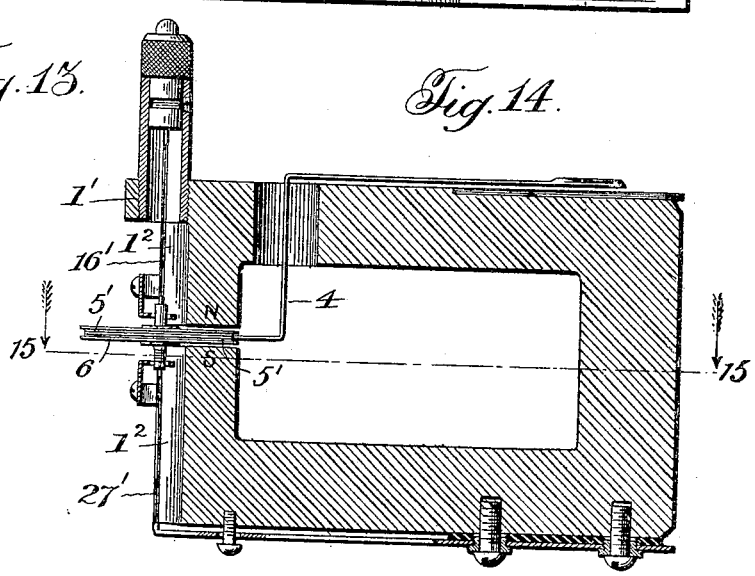
Figure 15:
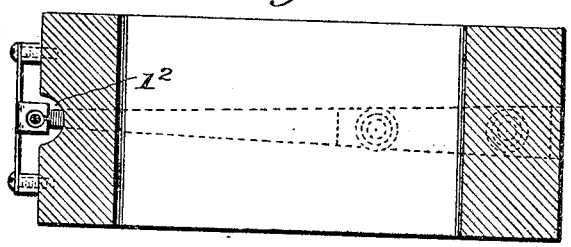

Referring to the accompanying drawings, which form a part of this specification, and in which is illustrated one form of my said invention and modifications thereof, Figure 1 is a top plan view of a portable galvanometer embodying my invention; Fig. 2, a central vertical longitudinal section through the containing box, showing a portion of the magnet broken away; Fig. 3, a section on line 3 3, Fig. 1, showing the magnet system in elevation; Fig. 4, a detail top plan view of the four-coil suspended system; Fig. 5, a central cross-section of the same; Fig. 6, a detail section of a modified form of suspension-terminal; Fig. 7, a detail plan view of one of the guards for limiting the sidewise movement of the suspended system; Fig. 8, a front elevation of the same, and Fig. 9 an end elevation of the same; Figs. 10, 10$^a$, and 10$^b$, diagrams of different forms of coil systems and magnets. Figs. 11 to 15, inclusive, illustrate a modified form of galvanometer embodying my invention, in which Fig. 11 is a top plan view of the coils of the moving system; Fig. 12, a top plan view of the galvanometer removed from its containing-box; Fig. 13, an end elevation of the same; Fig. 14, a central vertical longitudinal sectional view of the same; and Fig. 15, a section on the line 15 15, Fig. 14, looking in the direction of the arrow.

In carrying out the form of my invention shown in Figs. 1 to 9 I employ a substantially U-shaped cast-iron permanent magnet 1, cast in one piece, having inwardly-directed poles at one end, so as to have north polarity only on one side of the air-gap separating the poles and south polarity only on the other side of the air-gap, all the magnetic lines of force passing between the poles being therefore in substantially the same direction. This magnet is slotted, as at 2, to accommodate a suspended coil system 3, mounted for movement between the poles of said magnet and adapted to impart motion to the pointer 4. The slot 2, as will be seen, is purely for mechanical purposes. The magnetic action would be the same if the slot were not there—that is, it would be just the same if there were a single pole-face on each side of the air-gap, as shown in dotted lines in Fig. 10, instead of two, as shown in Figs. 2 and 3.

The movable system consists in the present case of four coils 5 of very fine wire wound alternately in opposite directions, so as to produce alternate north and south poles when viewed from one side, as shown in the diagram Fig. 10. These coils are spaced with their centers preferably ninety degrees apart and all lie in the same (preferably horizontal) plane, being held between two disks of aluminium or other non-magnetic metal 6. These disks while supporting the coils act also to damp the system and render it practically dead-beat. The coils are clamped tightly between the disks 6 by means of a flanged screw-threaded spindle 7 and a flanged nut 8. The lower shank of the spindle 7 is split, as at 9, the portion 10 being insulated from the main shank, as at 11. These split portions are bound together by suitable insulating material 12. A separating-collar 13, of insulating material, is inserted between the disks 5 and surrounds spindle 7. Wires 14 and 15, leading to and from the coils 5, are connected, respectively, to the spindle 7, through the nut 8, and to the insulated portion 10 of the spindle, all as shown most clearly in Fig. 5.

Whether there be two coils or a greater number employed, as hereinafter described, it is preferable that the pole-faces of the magnet be so shaped and so placed above and below the plane of the coils that at all times approximately half of the coil-surface will be between pole-faces and half not between pole-surfaces. (See Figs. 10 and 10ᵃ.)

The system is suspended by a fine wire or conducting-filament 16, which is soldered at one end to the end 17 of the spindle 7 and at its other end to a coil-spring 18, secured at its upper end to a plug 19, carried by a hollow adjusting-head 20, in which the spring 18 is also carried. (See Fig. 3.) The adjusting-head 20 is mounted to turn in the upper end of a metal tube 21, screw-threaded into the magnet at its lower end, as at 22. This adjusting-head is provided with an annular groove 23, which extends a part of the way around it, and into this groove extends the end of a screw 24, which, engaging the end of the groove, acts to limit the extent to which the adjusting-head may be turned, and therefore prevents the suspension wire or filament from being twisted off by turning the adjusting-head too far. The plug 19 is held from turning in the head 20 by the set-screw 25. To the end 26 of the member 10 of the suspended system is soldered a fine wire or conducting-filament 27, similar to the filament 16, and the lower end of this filament 27 is soldered to the end of a flat spring 28, made fast at one end by screws 29 to the bottom of the magnet and insulated therefrom, as at 30. The filament 27 is of such length that the spring 28 will keep it taut.

In order to prevent the spring 28 by its inertia from breaking the filament 27 or both filaments, a limiting-screw 29' is provided. This screw passes through an opening 28' in the spring and is screwed into the magnet, as shown. The head of the screw acts to limit the downward movement of the spring.

Instead of using single-strand filaments 16 27 I may employ a plurality of filaments arranged side by side, as shown in Figs. 13 and 14 and hereinafter more particularly described.

In order to limit the sidewise movement or play of the suspended system—that is, the movement of the system out of the line of its suspension—and thus to guard against the liability of the suspension-filaments to become broken by shocks which the instrument may receive, I provide two guard-pieces 31 and 32, secured by screws 33 and 34 or otherwise to the ends of the magnet 1. These guards consist each preferably of metal stamping having wings 35, with holes 36 made elongated for adjustment and adapted to receive the attaching-screws, and an extension 37, bent at right angles to form the portions 38, which portions are provided each with an opening 39, into which leads a slot 40. The ends of the suspended system extend through the openings 39 of these guards, with a slight clearance between the spindle of the system and the guards. By means of this arrangement the system is allowed to turn or oscillate freely around the axis of its suspension; but its side-to-side movement is limited by the guards, thus greatly reducing the liability of a sudden jolt or shock to break the fine suspension-filaments.

The movement of the system vertically is limited by the pole-faces of the magnet, thereby affording an additional means to prevent the breaking of the filaments.

The suspended system, mounted as described, is accurately balanced, so that the instrument may be used in a slanting position as well as in a horizontal or level position.

Upon the upper face of the magnet is a suitable scale 41, over which the pointer 4 is adapted to move, the magnet being provided with an opening 42 to admit of the required movement of the pointer.

The scale over which the pointer moves may be calibrated up to a certain number of divisions on each side of the zero, so that up to this limit the galvanometer will serve as a direct reading measuring instrument when its constant has been once determined.

The instrument thus constructed is mounted in a suitable box or casing 43, to the top of which the magnet is made fast, as by screws 44, which pass through the top into the magnet, the adjusting-head 20 extending through the top, as shown, so that the pointer may be adjusted without removing the cover.

The scale is adapted to be read through a circular opening 45 in the top of the box, the said opening being provided with a glass top 46, held down by a brass ring 47.

The binding-posts 48 49, mounted upon one end of the box-top, form the terminals of the electrical circuits of the instrument, which may be traced as follows: from the binding-post 48 by wire 50 to the spring 28, thence by conducting-filament 27 to insulated member 10 of the suspended system, wire 15, coils 5, wire 14, nut 8, and spindle 7 to conducting-filament 16, thence through spring 18 into adjusting-head, tube 21, magnet 1, and thence by wire 51, connected to said magnet, back to binding-post 49.

When the current traverses the system as described, the coils will become polarized, as shown in the diagram Fig. 10—that is, adjacent coils will have opposite polarity when viewed from the same side. Therefore the north-pole faces of the permanent magnet 1 will repel the north-pole coils and attract the south-pole coils and the south-pole faces of the magnet will repel the south-pole coils and attract the north-pole coils, so that rotation or partial rotation will be imparted to the system in the direction of the arrow at the bottom of Fig. 10. Obviously when current passes through the coils in the opposite direction from the above the movement of the system will be in an opposite direction. In this connection it will be observed that the direction of the magnetic flux or lines of force through the coils will be substantially at right angles to the plane in which the coils move.

A galvanometer differing somewhat in construction from the one just described, but embodying the essential principles thereof, is shown in Figs. 11 to 15. In the latter form—that is, as illustrated in Figs. 11 to 15—I employ two elongated coils instead of four coils, as in the former case. These coils 5' are, as in the former case, clamped between two aluminium plates 6 and suspended in substantially the same manner, except in the latter case I have shown the system suspended by a plurality of filaments 16' and 27', though the single-strand filament suspension may be employed in this form of instrument, as in the first form described. There is, however, a distinct advantage gained in using the multiple-strand suspension where it is desired to increase the tensile strength. The multiple-strand suspension admits of an increase in tensile strength without increasing the torsion to anything like the same extent that it would be increased were the increase in tensile strength gained by simply employing a single filament of increased diameter. This will be more apparent when it is understood that the torsion is proportional to $d^4$ where $d$ is the diameter, while the tensile strength is proportional to $d^2$.

The pointer is secured at one end to a strip of insulating material 4', made fast between the coils, as shown most clearly in Fig. 11.

The magnet in the form of instrument shown in Figs. 11 to 15 has two pole-faces, between which the system is suspended in such manner that normally—that is, when not deflected—only a portion of both coils extend into the air-gap between the poles, though at all times only about one-half of the coil-surface is between the pole-faces. On account of this arrangement of the coils the suspension-terminal is mounted slightly forward of the magnet-poles, for which purpose the magnet is provided with an extension 1'. The front of the magnet is slotted vertically, as at $1^2$, to accommodate the suspended system. The coils of the system are wound in opposite directions, so that when current traverses them they will produce poles of opposite polarity when viewed from the same side. One of the coils will then swing around to inclose the greatest number of lines of force, while the other coil will be repelled, the movement of the said coils depending upon the direction of the current entering the same.

The principle of the invention is not altered by the number of coils employed. Thus I may use a single magnet and one coil system, as shown in Fig. $10^b$, where $1^3$ represents one pole of a magnet and 3' a one-coil system suspended or pivoted at a point $3^2$. On the other hand, a large number of coils—eight, for example, as shown in Fig. $10^a$—may be used, when the pole-face of the magnet may be made of the shape shown in dotted lines $1^4$ or other suitable shapes, as may be desired. While I have shown and described a form of my invention in which a permanent magnet is used to produce the magnetic field, the invention is equally applicable when alternating currents are to be measured or indicated, in which case the field would be produced by a coil or coils instead of by a permanent magnet.

A modified form of suspension-terminal is shown in Fig. 6. In this latter form the filament 16 is connected to a plunger 52, having a tubular stem 53, surrounded by a coil-spring 54. The plunger and spring are carried in a hollow plug 55, the upper end of which is closed by a screw 56. This hollow plug 55 fits into the adjusting-head 57 and is held fast therein by the set-screw 58. The adjusting-head 57 fits into the end of a tube 21', carrying a screw 24', which extends into an annular slot 23' in the adjusting-head for the purpose of limiting the rotation thereof as described with relation to Fig. 3, the said slot 23' extending only a part of the way around said head.

My invention is susceptible to other modifications without departing from the spirit thereof; but

What I claim is—

1. In an electrical measuring instrument, the combination with a single field-magnet having a plurality of pole-faces of north polarity only on one side of the air-gap separating the poles of said magnet and a plurality of pole-faces of south polarity only opposite said north poles, of a flat coil system supported to move in said air-gap in a plane substantially at right angles to the direction of the magnetic lines of force between the poles of said magnet.

2. In an electrical measuring instrument, the combination with a single field-magnet having a plurality of pole-faces of north polarity only on one side of the air-gap separating the poles of said magnet, and a plurality of pole-faces of south polarity only opposite said north-pole faces, of a suspended coil system adapted to move in said air-gap in a plane substantially at right angles to the direction of the magnetic lines of force passing between the poles of said magnet.

3. In an electrical measuring instrument, a single field-magnet, a movable coil system comprising a plurality of coils suspended to lie in a plane substantially at right angles to the direction of the lines of force passing between the poles of said magnet, said coils being so arranged relative to the poles of said magnet that in the position of no deflection, approximately one-half of each coil will be between opposite pole-faces and at all times a portion only of the coil area will be between opposite pole-faces.

4. In an electrical measuring instrument, a single field-magnet, a movable coil system comprising a plurality of flat coils suspended to lie and move in a plane substantially at right angles to the direction of the lines of force passing between the faces of said magnet, said coils being so arranged relative to the poles of said magnet that in the position of no deflection, approximately one-half of each coil will be between opposite pole-faces and at all times a portion only of the total coil area will be between opposite pole-faces.

5. In an electrical measuring instrument, the combination with a field-magnet, of a coil system mounted for movement in the field of said magnet in a plane substantially at right angles to the direction of the lines of force passing between the poles of said magnet, said system comprising two elongated coils mounted side by side in the plane of their movement, a portion only of each of said coils extending into the field of said magnet in the position of no deflection, approximately one-half of the coil area of said system being at all times between opposite pole-faces of said magnet.

6. In an electrical measuring instrument, the combination with a field-magnet having elongated pole-faces, of a coil system mounted for movement in the field of said magnet between said pole-faces, said coil system comprising two elongated oppositely-wound coils mounted side by side in the same plane substantially at right angles to the direction of the lines of force of said magnet, said coils being so mounted that their major axes are substantially at right angles to that of the pole-faces of the magnet, with a portion only of the length of both of said coils extending into the field of said magnet in the position of no deflection, and arranged to move so that one of said coils will move into the field of said magnet and the other recede therefrom when current traverses said coils, substantially as described.

7. In an electrical measuring instrument, spring-terminals, a movable coil system, means to suspend said system between said spring-terminals, guards to limit the movement of said system out of the line of its suspension, and a field-magnet acting to limit the movement of said system in the direction of its line of suspension, said magnet having a pole-face on each side of the plane of said coil system.

8. In an electrical measuring instrument, a tube, a hollow plug mounted to turn in the end of said tube, means to limit the turning movement of said plug, a second plug mounted in the first, a suspension-filament, and a spring connection between said filament and said second plug.

9. In an electrical measuring instrument, a tube, a hollow plug mounted to turn in the end of said tube, means to limit the turning movement of said plug, a second hollow plug mounted in the first, and means to hold the second plug fast within the first, a plunger mounted in the second plug, a spring between said plunger and said second plug, and a suspension-filament connected to said plunger.

10. In an electrical measuring instrument, the combination with a single permanent magnet, of a coil system consisting of a plurality of flat coils mounted in a common plane, resilient suspension-terminals, means for suspending said coil system between said terminals so that said coils may have a deflective movement in the field of said magnets in a plane substantially at right angles to the direction of the lines of force, the pole-faces of said magnet acting to limit the movement of said system in the direction of the line of its suspension, and guards to limit the movement thereof in a direction at right angles to the line of suspension, substantially as described.

11. In an electrical measuring instrument, the combination with a single permanent magnet, of a coil system consisting of a plurality of flat coils mounted in a common plane, resilient suspension-terminals, means for suspending said coil system between said terminals so that said coils may have a deflective movement in the field of said magnets in a plane substantially at right angles to the direction of the lines of force, the pole-faces of said magnet acting to limit the movement of said system in the direction of the line of its suspension, guards to limit the movement thereof in a direction at right angles to the line of suspension, and a non-magnetic metal disk mounted to move in the field of said magnet with said coils and to damp their movement, subtially as described.

12. In an electrical measuring instrument, the combination with a single field-magnet, of a flat coil system suspended for movement between the poles of said magnet in a plane substantially at right angles to the direction of the lines of force passing between the poles of said magnet, a scale mounted on the top of the said magnet, and a pointer carried by said movable system and adapted to pass over said scale.

13. In an electrical measuring instrument, the combination with a substantially U-shaped bipolar cast-iron field-magnet, cast in one piece with inwardly-extending pole-pieces at one end, of a coil system suspended for deflective movement between the poles of said magnet in a plane substantially at right angles to the lines of force passing between said poles.

14. In an electrical measuring instrument, an inclosing box or casing having an opening in its top, of a transparent covering for said opening, a magnet mounted in said box, a suspension-terminal extending through the top of said box and provided at its end outside of said box with an adjusting-head, a coil system suspended from said terminal for deflective movement between the poles of said magnet in a plane substantially at right angles to the direction of the lines of force passing between the poles of said magnet, a scale mounted on the upper face of said magnet and beneath said opening, and a pointer carried by said system and arranged to move over said scale.

15. In an electrical measuring instrument, the combination with a suspended flat coil system, of a magnet having facing pole-pieces between which the said system is adapted to have deflective movement, the pole-pieces of said magnet being located on opposite flat sides of said coil system, and also on opposite sides of said suspension.

16. In an electrical measuring instrument, the combination with a suspended flat coil system, of a magnet having facing pole-pieces between which the said system is adapted to have deflective movement, the pole-pieces of said magnet being located on opposite flat sides of said coil system, and also on opposite sides of said suspension, a scale carried above the magnet, and a pointer carried by said moving system and adapted to move over said scale.

17. In an electrical measuring instrument, a flat moving coil system carried by torsional conducting-suspensions extending between two supports arranged to yield in the direction of the line of suspension, and a magnet having facing pole-pieces between which the said system is adapted to have deflective movement, the pole-pieces of said magnet being located on opposite flat sides of said coil system, and also on opposite sides of said suspension.

18. In an electrical measuring instrument, a flat moving coil system carried by torsional conducting-suspensions extending between two supports arranged to yield in the direction of the line of suspension, and a magnet having facing pole-pieces, between which the said system is adapted to have deflective movement, the pole-pieces of said magnet being located on opposite sides of said coil system, reckoning in the direction of the line of suspension, and also on opposite sides of said suspension, all of the windings of said system being at all times acted on by said magnet during the operation of the instrument, a scale carried above said magnet, and a pointer carried by said system and adapted to move over said scale.

19. In an electrical measuring instrument, the combination with a movable system, a multiple suspension therefor consisting of a plurality of filaments lying substantially parallel and having a tensile strength equal to the sum of the tensile strengths of each of the filaments and a torsional force per unit of length less than would be the torsional force if the same cross-section of material were combined in a single filament, the several filaments of said suspension being adapted to convey current in the same direction.

20. In an electrical measuring instrument, a field-magnet, a movable system, a plurality of torsional conducting-suspensions in parallel contact and supporting said system from both sides, between the poles of said magnet, and yielding supports to which the ends of said suspensions are secured.

21. In an electrical measuring instrument, a field-magnet having facing pole-pieces, a coil system, two spring-supports, one of which is angularly adjustable for the angular adjustment of said coil system, and means to suspend said coil system between said spring-supports for deflective movement between the poles of said magnet.

22. In an electrical measuring instrument, a field-magnet having facing pole-pieces, a coil system, two spring-supports, means to suspend said coil system between said supports for deflective movement between the poles of said magnet, an index carried by said moving system, a scale over which said index is adapted to move, an inclosing case, and means operative from the outside of said case for angularly adjusting one of said spring-supports and therethrough the moving coil system and index.

23. In an electrical measuring instrument, a field-magnet having facing pole-pieces, a coil system, two spring-supports, one of which is angularly adjustable for the angular adjustment of said coil system, means to suspend said coil system between said spring-supports for deflective movement between the poles of said magnet, and a stop arranged to limit the movement of said system out of the line of its suspension.

In testimony whereof I affix my signature in presence of two witnesses.

EDWIN F. NORTHRUP.

Witnesses:
 JOHN B. HENKELS,
 JOS. WALKER.